(12) United States Patent
Brimeyer

(10) Patent No.: US 11,559,000 B2
(45) Date of Patent: Jan. 24, 2023

(54) LOCKOUT SYSTEM FOR HEADER

(71) Applicant: Deere & Company, Moline, IL (US)

(72) Inventor: Alex Brimeyer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 358 days.

(21) Appl. No.: 16/886,844

(22) Filed: May 29, 2020

(65) Prior Publication Data

US 2021/0368681 A1 Dec. 2, 2021

(51) Int. Cl.
*A01D 41/14* (2006.01)
*F16D 13/58* (2006.01)
*A01D 75/28* (2006.01)

(52) U.S. Cl.
CPC ......... *A01D 41/145* (2013.01); *A01D 41/141* (2013.01); *F16D 13/585* (2013.01); *A01D 75/287* (2013.01)

(58) Field of Classification Search
CPC ... F16D 13/585; A01D 41/145; A01D 41/141; A01D 75/287; A01D 41/14; A01D 47/00; A01D 67/00
See application file for complete search history.

(56) References Cited

U.S. PATENT DOCUMENTS

| | | | | |
|---|---|---|---|---|
| 1,451,140 A * | 4/1923 | Brown | ................... | A01D 34/02 56/15.8 |
| 2,513,703 A * | 7/1950 | Annis | .................... | A01D 34/04 56/10.4 |
| 2,915,870 A | 12/1959 | Hume | | |
| 3,698,164 A * | 10/1972 | Boone | ................... | A01D 41/141 56/DIG. 15 |
| 3,747,311 A * | 7/1973 | DeCoene | ............. | A01D 41/141 56/208 |
| 4,124,970 A * | 11/1978 | Bernhardt | .............. | A01D 57/04 56/DIG. 15 |
| 4,204,383 A * | 5/1980 | Milliken, Jr. | .......... | A01D 57/00 56/DIG. 15 |
| 4,573,308 A * | 3/1986 | Ehrecke | ................. | A01D 41/14 56/15.8 |
| 4,599,852 A * | 7/1986 | Kerber | .................... | A01D 41/14 56/15.8 |

(Continued)

FOREIGN PATENT DOCUMENTS

| | | | | |
|---|---|---|---|---|
| EP | 3498071 A1 * | 6/2019 | ............. | A01D 34/24 |
| EP | 3942918 A1 * | 1/2022 | .......... | A01D 41/141 |
| WO | WO-2020101859 A1 * | 5/2020 | ............. | A01D 34/04 |

OTHER PUBLICATIONS

Case IH 3162—Draper Header (Nov. 2011 -) Parts (messicks.com), pp. 1-5, [online], [retrieved on Apr. 6, 2020]. Retrieved from the Internet <URL: https://www.messicks.com/commoncatalog?vendor=cas&modelId=142078&sectionId=300671&diagramId=1336949>.

(Continued)

*Primary Examiner* — Arpad F Kovacs

(57) ABSTRACT

Systems and apparatuses for articulating float arms of a harvester header between a flexible configuration and a rigid configuration are disclosed. The systems and apparatuses include a locking tube that experiences no torque or approximately no torque when the float arms are in the rigid configuration. Further, the systems and apparatuses also avoid adjustments to ensure that float arms are fully retracted, such as into abutting contact with another portion of a header.

18 Claims, 13 Drawing Sheets

(56) References Cited

U.S. PATENT DOCUMENTS

| | | | |
|---|---|---|---|
| 7,640,720 B1 * | 1/2010 | Lovett | A01D 57/20 56/153 |
| 7,805,921 B2 * | 10/2010 | Goers | A01D 41/141 56/364 |
| 7,877,976 B2 * | 2/2011 | Honas | A01D 41/14 56/208 |
| 7,930,871 B1 * | 4/2011 | Figgins | A01D 34/283 56/208 |
| 7,937,919 B2 * | 5/2011 | Goers | A01D 61/002 56/15.8 |
| 7,992,374 B1 * | 8/2011 | Bich | A01D 41/141 56/208 |
| 8,393,135 B2 * | 3/2013 | Honas | A01D 41/14 56/181 |
| 8,534,037 B2 * | 9/2013 | Sauerwein | A01D 57/20 56/153 |
| 8,601,779 B1 | 12/2013 | Figgins et al. | |
| 9,148,999 B2 * | 10/2015 | Fuechtling | A01D 43/06 |
| 11,246,259 B2 * | 2/2022 | Yanke | A01D 34/283 |
| 11,382,262 B2 * | 7/2022 | Thomas | A01D 34/283 |
| 2003/0010010 A1 * | 1/2003 | Buermann | A01D 41/14 56/257 |
| 2003/0074876 A1 | 4/2003 | Patterson et al. | |
| 2007/0204585 A1 * | 9/2007 | Lovett | A01D 61/002 56/15.8 |
| 2009/0249760 A1 * | 10/2009 | Sauerwein | A01D 43/06 56/181 |
| 2009/0277147 A1 * | 11/2009 | Honas | A01D 41/14 56/208 |
| 2009/0293441 A1 * | 12/2009 | Sauerwein | A01D 57/20 56/208 |
| 2010/0083629 A1 | 4/2010 | Klotzbach et al. | |
| 2014/0090345 A1 * | 4/2014 | Honas | A01D 43/06 56/181 |
| 2015/0007545 A1 | 1/2015 | Honas et al. | |
| 2019/0230858 A1 * | 8/2019 | Shearer | A01D 41/145 |
| 2020/0053963 A1 | 2/2020 | Vandeven et al. | |
| 2021/0185875 A1 * | 6/2021 | Noll | A01D 34/04 |
| 2021/0368675 A1 * | 12/2021 | Brimeyer | F16H 25/14 |

OTHER PUBLICATIONS

Case-IH-3152-3162-Draper-Header-Productivity-Guide-GH-2073-20, copyright 2020, pp. 1-24.

\* cited by examiner

LOCKOUT SYSTEM FOR HEADER

FIELD OF THE DISCLOSURE

The present disclosure relates generally to harvesting headers and, more particularly, to draper headers.

BACKGROUND OF THE DISCLOSURE

Agricultural harvesters use a variety of implements attached to gather crops. A "draper" or "draper header" is one such type of these implements. Conventional draper headers use conveyors with endless belts to carry cut crop material from leading-edge knives to center regions of the headers. From there, the cut crop material is conveyed into the harvesters. Once in the harvester, the cut crop material is further processed by separating grain from unwanted crop material (typically called "material other than grain" or "MOG").

SUMMARY OF THE DISCLOSURE

A first aspect of the present disclosure is directed to a harvester header. The harvester header may include a frame; a plurality of float arms pivotably coupled to the frame; a knife coupled to distal ends of the float arms; and a locking system moveable between a flexible configuration in which at least one of the float arms is pivotable relative to the frame and a rigid configuration in which the at least one float arms is pivotably fixed relative to the frame. The locking system may include a rotatable component rotatably coupled to the frame and a tensioner. The tensioner may include a first end pivotably coupled to the rotatable component; a second end pivotably coupled to a float arm of the plurality of float arms; and a biasing component extending between the first end and the second end, the rotatable component rotates in a first direction to pivotably fix the float arm relative to the frame and compress the biasing component when the locking system is moved into a rigid configuration and the rotatable locking component rotatable in a second direction, opposite the first direction, to permit pivotable movement of the float arm relative to the frame.

A second aspect of the present disclosure is directed to a method of actuating float arms of a harvester header between a flexible configuration in which a knife of the harvester header is able to flex along a length thereof and a rigid configuration in which the knife is prevented from flexing along the length thereof. The method may include rotating a rotatable component that laterally extends along a length of a harvester header about a centerline of the rotatable component, a plurality of float arms of the harvester header pivotably coupled to the rotatable component; and one of retracting a first shaft in a first direction in response to rotation of the rotatable component in a first angular direction to compress a biasing component, the retraction of the first shaft in the first direction pivoting a float arm of the plurality of float arms into abutting contact with a portion of a frame of the harvester header in response to rotation of the rotatable component in the first angular direction or extending the first shaft in a second direction, opposite the first direction, in response to rotation of the rotatable component in a second angular direction, opposite the first angular direction, to expand the biasing component, the extension of the first shaft in the second direction pivoting the float arm of the plurality of float arms away from abutting contact with the portion of the frame of the harvester header in response to rotation of the rotatable component in a second angular direction.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
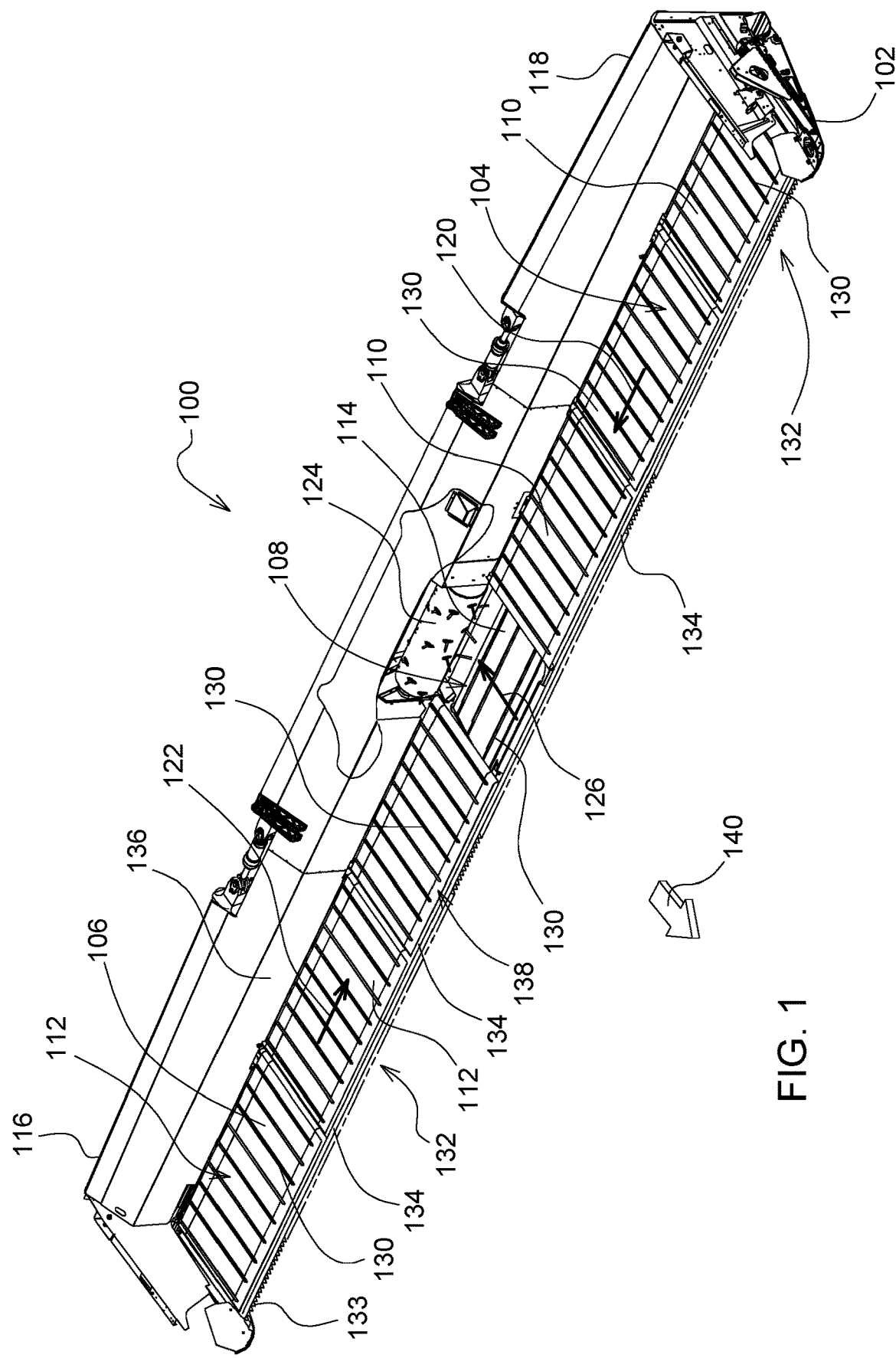
FIG. 1 is a perspective view of an example draper header, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to harvester headers and, particularly, to draper headers that include locking systems that are movable between a flexible configuration and a rigid configuration. In the flexible configuration, float arms of the header are freely pivotable about respective axes, and, in the rigid configuration, the float arms are retracted into contact with a portion of the header, thereby providing a knife attached to the float arms in a straight and rigid configuration. The locking systems provide for abutting contact between the float arms and another portion of the frame without any adjustment provided either during manufacturing or in the field, thereby reducing manufacturing and maintenance time and complexity. Further, in the rigid configuration, torque applied to a lockout tube is reduced to zero or approximately zero, thereby reducing size, weight, and cost of the header.

Words of orientation, such as "up," "down," "top," "bottom," "above," "below," "leading," "trailing," "front," "back," "forward," and "rearward" are used in the context of the illustrated examples as would be understood by one skilled in the art and are not intended to be limiting to the disclosure. For example, for a particular type of vehicle in a conventional configuration and orientation, one skilled in the art would understand these terms as the terms apply to the particular vehicle.

For example, as used herein, with respect to an endless belt, unless otherwise defined or limited, the term "forward" (and the like) corresponds to a forward direction of travel of the belt, with respect to a supporting frame (e.g., a frame of a draper header), during normal operation of the belt. Likewise, the term "rearward" (and the like) corresponds to a direction opposite the forward direction of travel of the belt. In this regard, for example, a "forward facing" feature on an endless belt may generally face in the direction that the belt travels during normal operation, while a "rearward facing" feature may generally face opposite that direction.

Also as used herein, with respect to a header (or components thereof), unless otherwise defined or limited, the term "leading" (and the like) indicates a direction of travel of the header during normal operation (e.g., the forward direction of travel of a harvester vehicle carrying a header). Similarly, the term "trailing" (and the like) indicates a direction that is opposite the leading direction. In this regard, for example, a "leading" edge of a knife assembly of a draper header may be generally disposed at the front of the knife assembly, with respect to the direction travel of the draper header during normal operation (e.g., as carried by a harvester vehicle). Likewise, a "trailing" edge of the knife assembly may be generally disposed at the back or a side of the knife assembly opposite the leading edge, with respect to the direction of travel of the draper header during normal operation.

FIG. 1 shows an example draper header 100 that includes a frame 102 that supports a first side conveyor and a second side conveyor 104 and 106 and a center conveyor 108. Each of the conveyors 104, 106, and 108 is configured as a belt-type conveyor extending over a respective circumferential length. The conveyors 104, 106, and 108 include endless belts 110, 112, and 114 that are moved in respective loops along the header 100 by motive devices, such as motors, gears, or internal belts. The conveyors 104 and 106 are disposed on opposing wings 116 and 118, respectively, of the header 100. In the illustrated example, the conveyor 104 includes two endless belts 110, and the conveyor 106 and two endless belts 112. In other implementations, the conveyors 104 and 106 may include additional or fewer endless belts. Further, although the conveyor 108 is shown as including a single endless belt 114, in other implementations, the conveyor 108 may include additional endless belts. The endless belts 110, 112, and 114 are supported on two or more rollers of the respective conveyors 104, 106, and 108.

In some implementations the endless belts 110, 112, and 114 may be formed from as elastomer-impregnated fabric belts. Generally, the endless belts 110 and 112 may be rotated such that upper surfaces of the endless belts 110 and 112 move inward along the header 100 in respective directions 120 and 122. In this way, material, such as cut plant matter, may be moved by the endless belts 110 and 112 to the center conveyor 108, which may, in turn, use the endless belt 114 to move the material off of the header 100. For example, the header 100 may offload the material onto a harvester vehicle to which the header 100 is attached. The header 100 also includes a cylindrical conveyor 124. The cylindrical conveyor 124 receives cut crop material from the center conveyor 108 and carries the crop material rearward (i.e., in a direction 126) through an aperture in the frame 102 located between the cylindrical conveyor 124 and the center conveyor 108 and, ultimately, into the harvester vehicle.

In the illustrated example, various cleats 130 are fixed to the surface of each of the endless belts 110, 112, and 114, with the cleats 130 generally extending in a direction transverse to the direction of travel of the respective endless belt 110, 112, or 114, e.g., directions 120, 122, and 126. In some implementations, the cleat 130 may extend less than an entire width of the endless belts 110, 112, and 114. For example, one or more of the cleats 130 may extend only partially across the respective width of the endless belts 110, 112, and 114, and, accordingly, may not extend to a leading edge or a trailing edge of the belts 110, 112, and 114.

The header 100 also includes a knife 132 at a leading edge 133 of the header 100. In some implementations, the knife 132 may be a reciprocating knife. The knife 132 cuts crop material, such as to sever crop material from a field. The knife 132 extends laterally along the header 100. In some implementations, the header 100 may also include a leading cover arranged between the knife 132 and the endless belts 110, 112, and 114, with the leading cover extending at least partly over a leading edge of at least the belts 110 and 112. As shown in FIG. 1, for example, the header 100 includes an elongated row of interlocking crop ramp segments 134 that extend along substantially the entire length of the header 20.

As depicted, the header 100 also includes a trailing cover 136, which may be in the form of a back sheet deflector or rear frame cover, separated from the crop ramp segments 134 by a width 138. The trailing cover 136 may serve to cover and protect various internal components of the header 100 and may also generally define a trailing end of a crop-carrying region of the header 100. In some implementations, the cleats 130 may extend over the entire width 138. In other implementations, the cleats 130 may extend over only a fraction of the width 138.

During a harvesting operation, a harvester vehicle may carry the header 100 through an agricultural field in a nominal forward direction 140. As the header 100 is moved across the field, the knife 132 operates to sever the crops at a location adjacent to the ground. The severed crop material generally falls in a trailing direction (i.e., generally opposite the direction 140), onto one or more of the three conveyors 104, 106, and 108. The conveyor 104 on the wing 118 carries the crop material in the direction 120, using the endless belts 110, toward the center of the header 100. The conveyor 106 carries the severed crop material in the direction 122, using the endless belts 112, toward the center conveyor 108, and the center conveyor 108 carries the severed crop material in the direction 126 towards and underneath the cylindrical conveyor 124. The severed crop material from the cylindrical conveyor 124 is transported in the direction 126 through the aperture in the frame 102 of the header 100 and into the agricultural harvester.

In the illustrated example, the conveyor 104 and the conveyor 106 are similarly configured, although the conveyors 104 and 106 may carry crop material in opposite directions 120 and 122, respectively. In other implementations, the conveyors 104 and 106 may be configured differently. Generally, however, the description herein of the conveyor 104 may be applicable to the conveyor 106, as well as other conveyors of other implementations.

Figure 2:
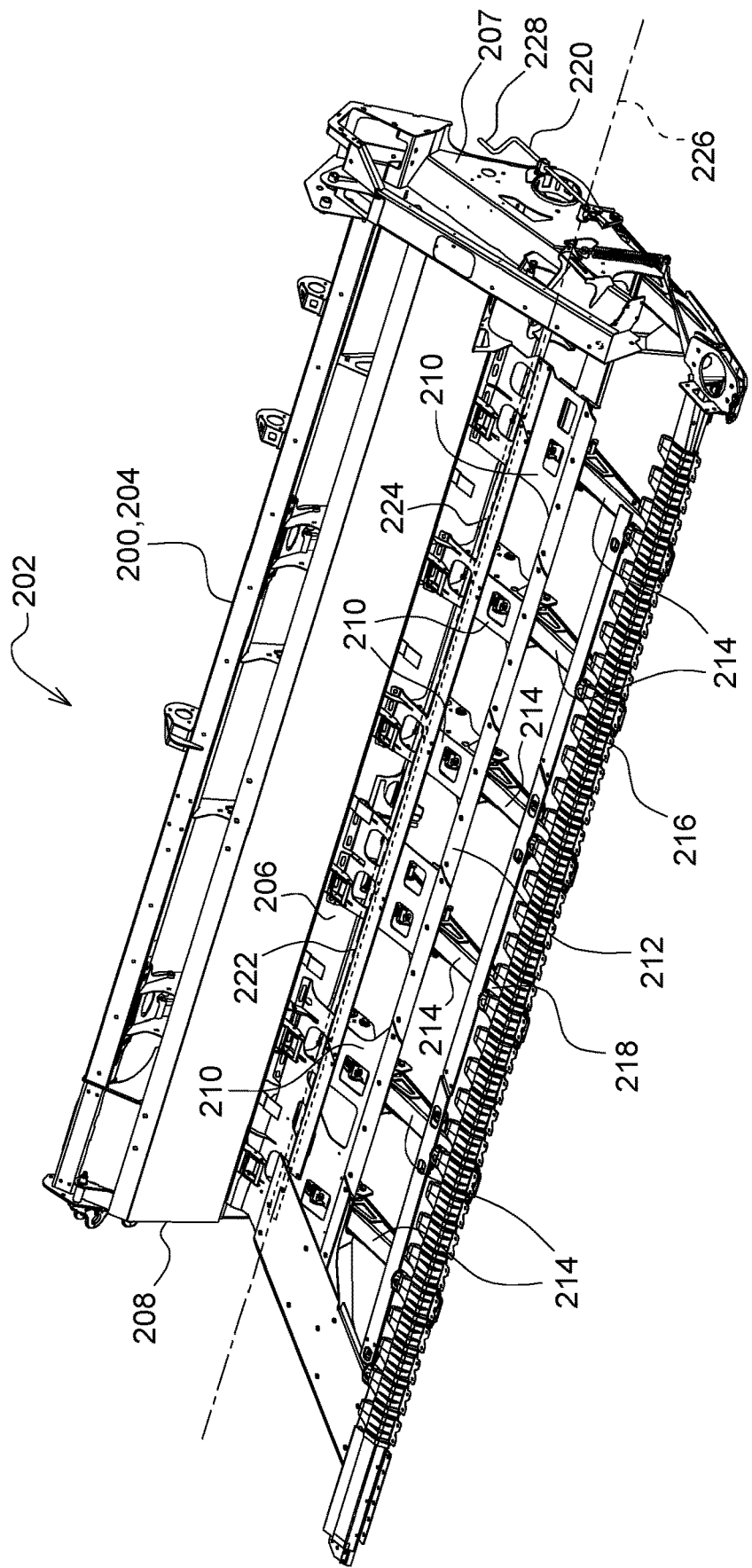
FIG. 2 is a perspective view of a portion of a frame of an example draper header, according to some implementations of the present disclosure.

FIG. 2 is a view of a portion of a frame 200 of a header 202, which may be similar to the header 100. The portion of the frame 200 illustrated corresponds to a portion of a wing 204 of the header 202. The wing 204 may be similar to wing 118 of the header 100. The frame 200 includes a beam 206 extending laterally along the frame 200. A back section 208 is coupled to the beam 206 and extends therefrom. The back section 208 also extends laterally along the frame 200. An outboard side section 207 connects to the beam 206 and the back section 208 and defines a lateral end of the frame 200. A plurality of mounting brackets 210 are also coupled to the beam 206. With the header 202 conventionally oriented, the brackets 210 general extend in a direction corresponding to a forward direction. The frame 200 also includes a laterally extending cross tube 212 that connects to each of the mounting brackets 210. In some implementations, the cross tube 212 may have a square, rectangular, or circular cross-sectional shape and may define a central passage. However, the cross tube 212 may have other cross-sectional shapes. Float arms 214 are pivotably coupled to the mounting brackets 210, and a knife 216 is coupled to distal ends 218 of each of the float arms 214. Similar to the knife 132, the knife 216 may be a reciprocating knife.

In some implementations, the mounting brackets 210 and corresponding float arms 214 may be laterally separated from adjacent mounting brackets 210 and corresponding float arms 214 by approximately 2.5 feet (ft) (0.8 meters (m)). In other implementations, the lateral separation 215 may be greater than or less than 2.5 ft (0.8 m). In still other implementations, the lateral separation 215 may vary. Thus, in some implementations, the lateral separation 215 between some adjacent mounting brackets 210 and corresponding float arms 214 may be uniform while the lateral separation between other adjacent mounting brackets 210 and corresponding float arms 214 may be non-uniform.

With the header 202 in an unsecured or flexible configuration, each of the float arms 214 are able to pivot independently of the other float arms 214. As a result, when the float arms 214 are in contact with the ground and propelled over the ground, such as during a harvesting operation, each of the float arms 214 is able to follow a topography or contour of the ground. In response to the float arms 214 conforming movement to the contour of the ground, the knife 216 flexes to also conform to the contour of the ground. As a result, a portion of the crop extending from the ground and remaining in a field may be generally consistent, e.g., a height by which the crop remaining in field extends from the ground may be generally uniform.

In a rigid configuration in which the float arms 214 are held in an abutting relationship against a portion of the frame 200, such as the cross tube 212, the float arms are prevented from following a contour of the ground and the knife 216 is maintained in a straight, rigid configuration, e.g., the knife 216 maintains a straight, unbent shape.

The header 202 also includes a locking system 220 that is operable to move the float arms 214 and the knife 216 between the flexible configuration and the rigid configuration. In some implementations, the header 202 includes a locking system 220 for each wing 204. The separate locking systems 220 are operable to move the float arms 214 and associated portion of the knife 216 of one wing between the rigid configuration and the flexible configuration independently of the float arms 214 and associated portion of the knife 216 of the other wing. Thus, in some implementations, the header 202 may include two locking systems 220. In other implementations, the header may include a single locking system 220 for all of the wings of the header 202.

The locking system 220 includes a rotatable component, which, in the example of FIG. 2, is a lockout tube 222. The lockout tube 222 extends laterally along the header 202 through apertures 224 formed in each of the mounting brackets 210. The lockout tube 222 is rotatable relative to the mounting brackets 210 about a centerline 226. A crank 228 is pivotably coupled to the lockout tube 222, such that rotation of the crank 228 causes rotation of the lockout tube 222 about the centerline 226.

Figure 3:
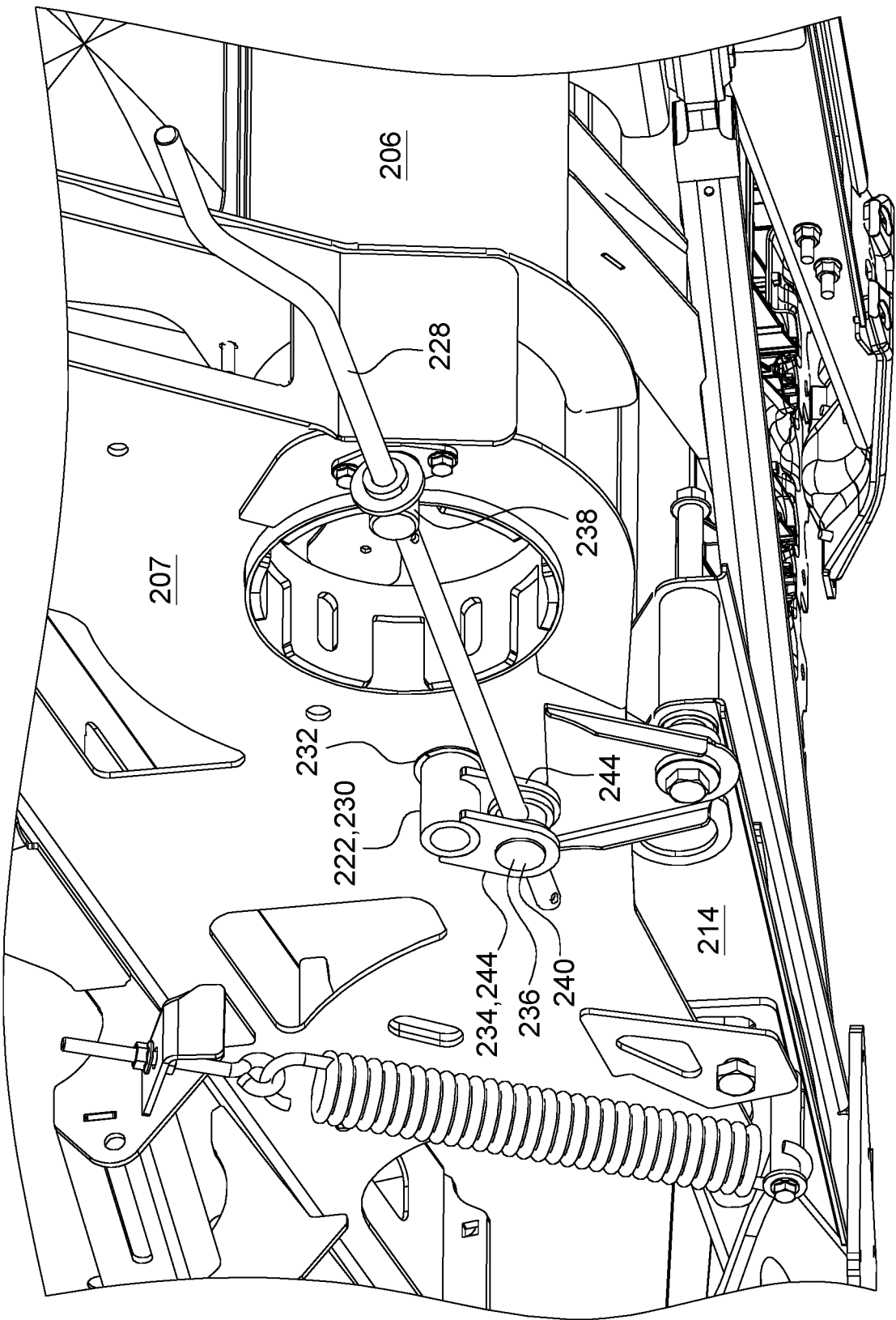
FIG. 3 is a perspective view of a portion of an example header frame showing a portion of a locking system, according to some implementations of the present disclosure

FIG. 3 is a detail view of a portion of the header 202. FIG. 3 shows crank 228 of the wing 204. The crank 228 is pivotably coupled to the side portion 207 of the wing 205. An end 230 of the lockout tube 222 extends from an aperture 232 formed in the side portion 207. A clevis 234 is formed at the end 230 of the lockout tube 222. The crank 228 is threadably coupled to a pin 236 received onto the clevis 234, which is discussed in more detail below. The crank 228 also extends through a bearing 238 that is attached to the side portion 207. In some implementations, the bearing 238 may be in the form of a bushing, roller bearing, or another type of bearing, such as a spherical bearing.

Figure 4:
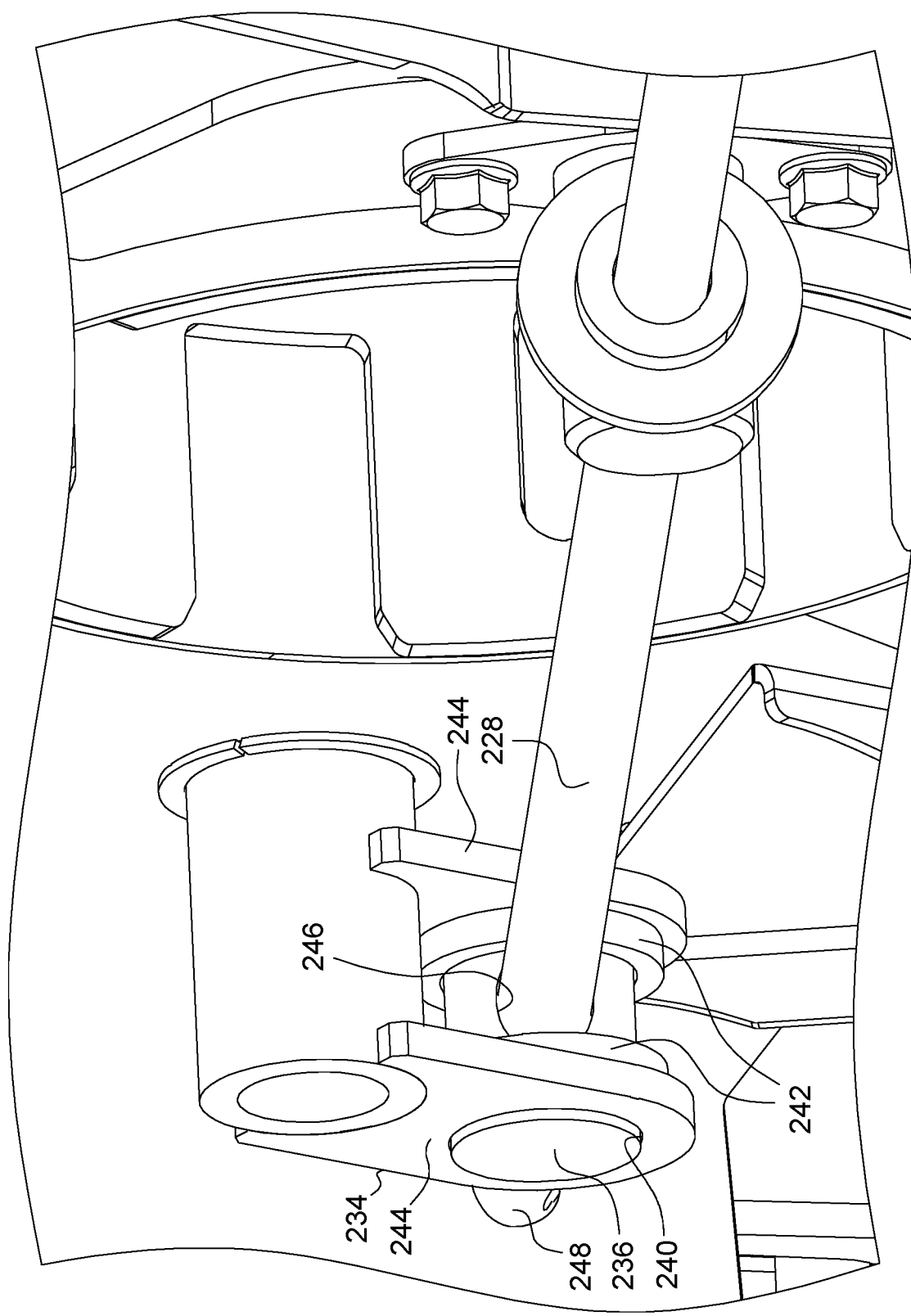
FIG. 4 is a detail perspective view of an interface between an end of a lockout tube and a crank of an example locking system, according to some implementations of the present disclosure.

FIG. 4 is a detail view showing a connection between the clevis 234 at the end 230 of the lockout tube 222 and the crank 228. The pin 236 is received through apertures 240 formed in sides 244 of the clevis 234. Spacers 242 are received onto the pin 236 and are located between the two sides 244 of the clevis 234. The pin 236 includes a threaded bore 246, and the crank 228 includes a threaded portion 248 that is threadably received into the threaded bore 246. A width of the spacers 242 are sized so that, with the threaded portion 248 of the crank 228 threadably received into the threaded bore 246, the pin 236 is prevented from being removed from the apertures 240.

Figure 5:
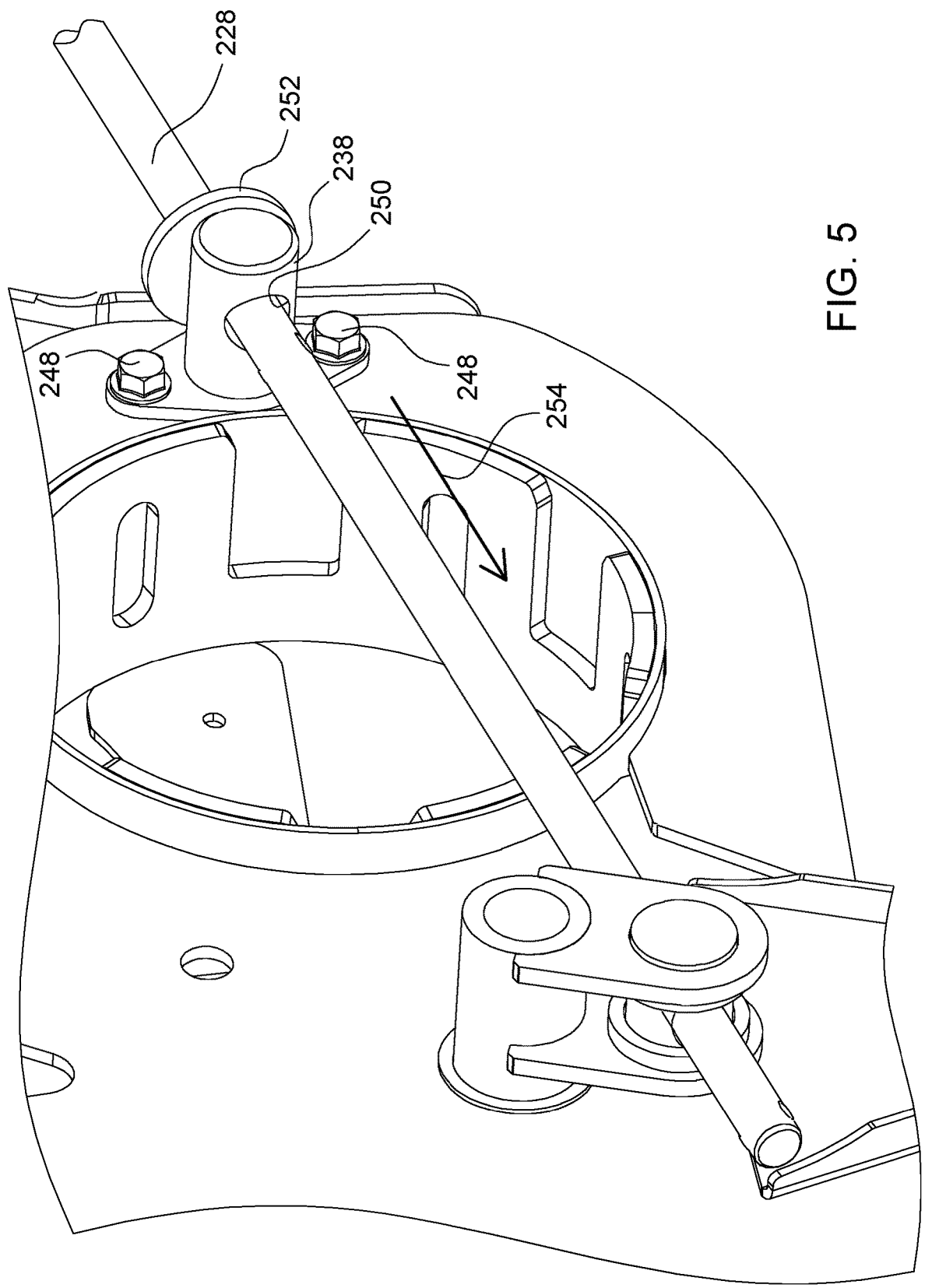
FIG. 5 is another perspective view of a portion of an example locking system, according to some implementations of the present disclosure.

FIG. 5 is detail view showing a connection between the crank 228 and the bearing 238. In the illustrated example, the bearing 238 is attached to the side portion 207 via fasteners 248, such as bolts. In other implementations, other types of fasteners may be used. Still further, the bearing 238 may be attached using other types of connection methods, such as a press fit, welding, an integral forming method, or any other coupling technique to couple the bearing 238 to the side portion 207. The bearing 238 includes a bore 250 through which the crank 228 extends. In the illustrated example, a cross-sectional size of the bore 250 is greater than a cross-sectional size of the crank 228 in order to accommodate pivoting of the crank 228 in response to rotation of the lockout tube 222 and clevis 234.

A flange 252 coupled to the crank 228 contacts the bearing 238 to limit how far the crank 228 is permitted to extend beyond the bearing 238 in the direction of arrow 254. The flange 252 may be, for example, integrally formed on the crank 238, a washer that is secured to the crank 238, or another arrangement that limits relative movement of the crank 238 and the bearing 238.

Figure 6:
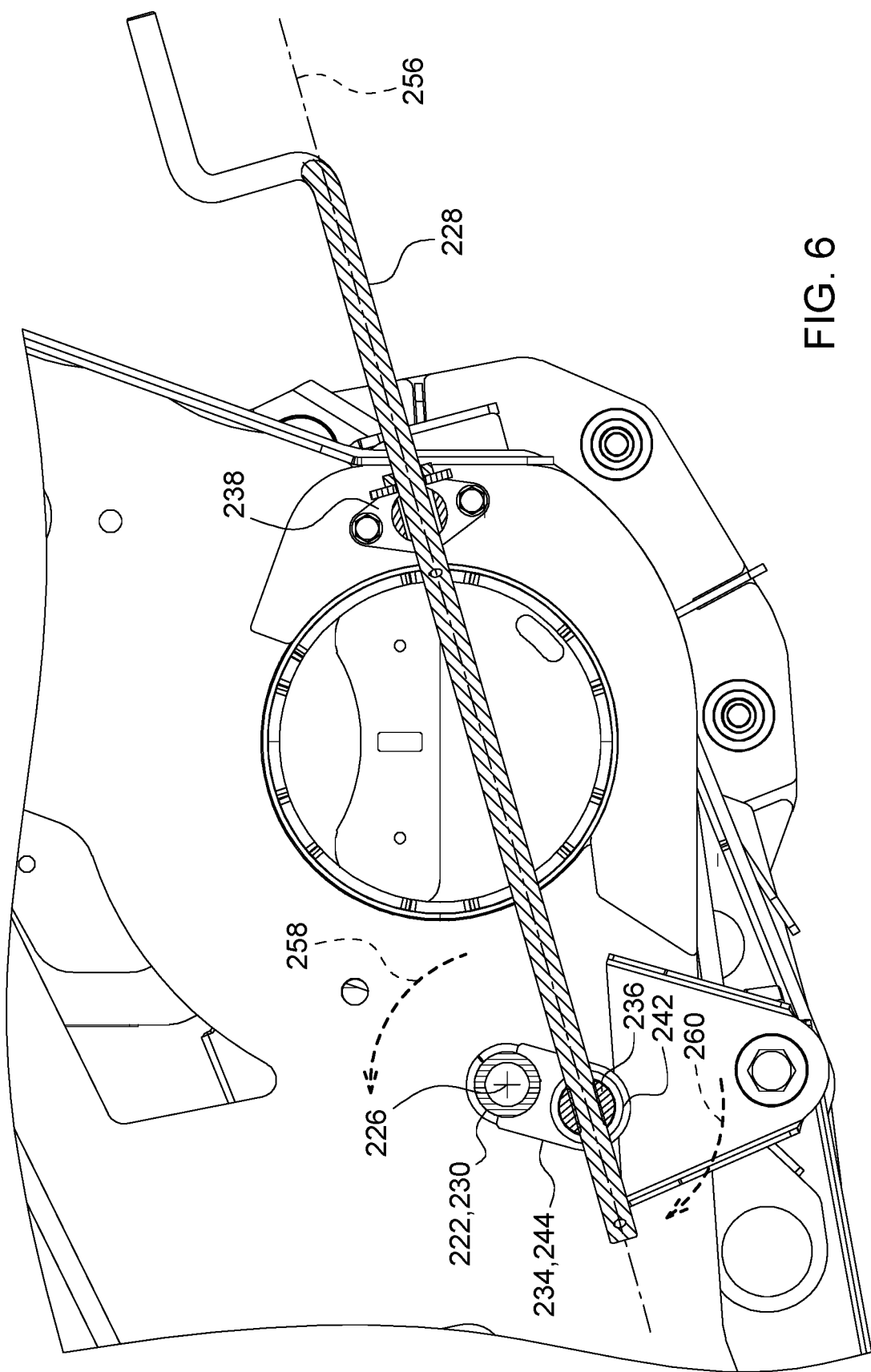
FIG. 6 is a cross-sectional view of a portion of an example locking system, according to some implementations of the present disclosure.

FIG. 6 is a cross-sectional view of a portion of the locking system 220. Particularly, FIG. 6 shows a cross-section of the crank 228, the bearing 238, the end portion 230 of the lockout tube 222, and the pin 236. As the crank 228 is rotated in a first rotational direction about a centerline 256 of the crank 228, the threaded engagement between the threaded bore 246 of the pin 236 and the threaded end portion 248 of the crank 228 causes the pin 236 to move relative to and along the threaded end portion 248, resulting in rotation of the lockout tube 222 in the direction of arrow 258 about the centerline 226 of the lockout tube 222. Rotation of the crank 228 in a second rotational direction cause rotation of the lockout tube 222 about the centerline 226 in the direction of arrow 260, opposite the direction of arrow 258.

Rotation of the lockout tube 222 in the direction of arrow 258 to a first position results in the float arms 214 being placed into a fully retracted position, which corresponds to the rigid configuration of the float arms 214 and knife 216. Rotation of the lockout tube 222 in the direction of arrow 260 to a second position resulting in the float arms 214 being placed in a fully extended position, which corresponds to the flexible configuration of the float arms 214 and knife 216. The weight of the float arms 214, when the header 202 is conventionally oriented, maintains tension in the crank 228 regardless as to the rotational position of the lockout tube 222 between the first and second position. Consequently, the crank 228 remains captured on the header 202.

Figure 7:
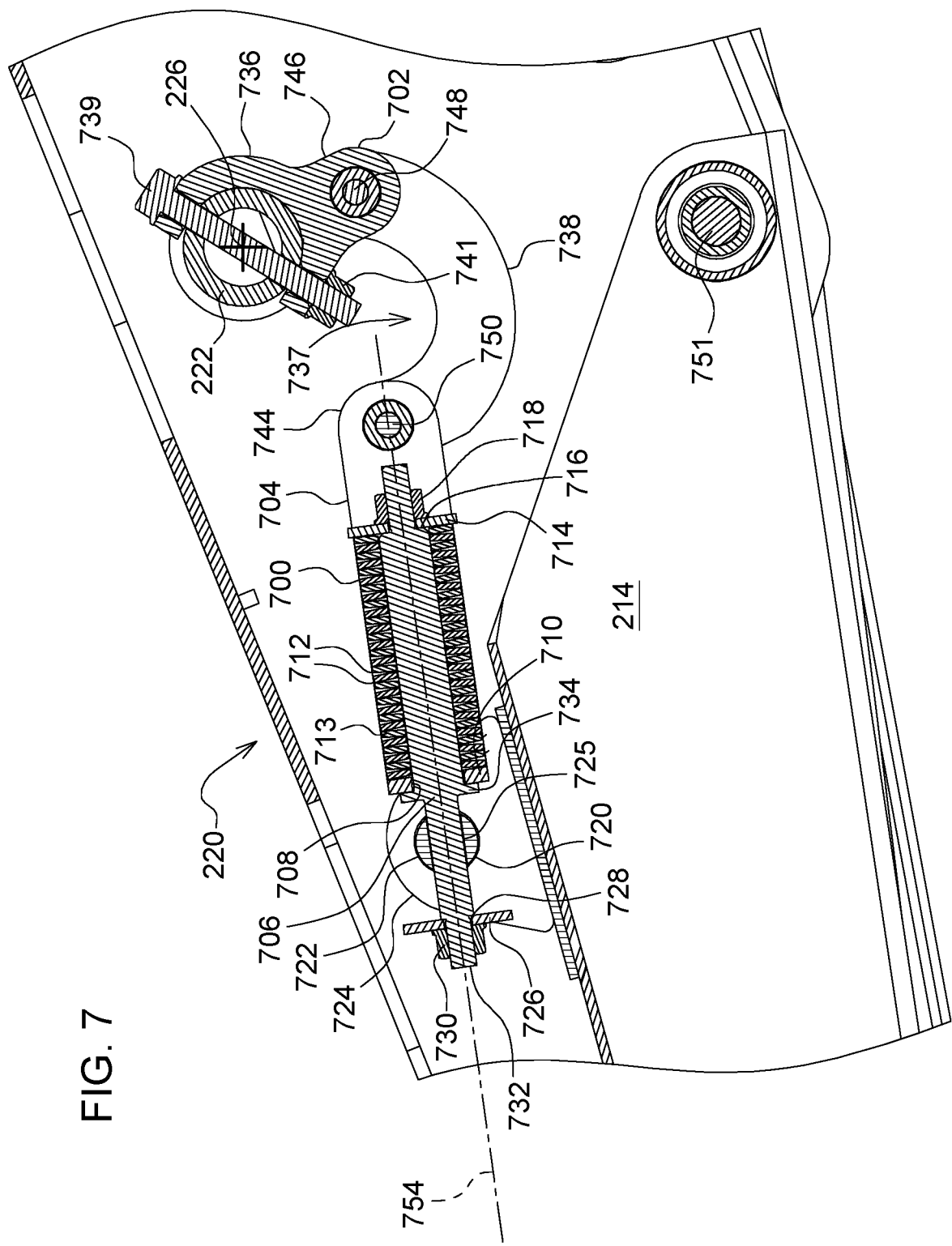
FIGS. 7 through 9 are cross-sectional views of a portion of a locking system illustrating movement of the locking system between a flexible configuration and a rigid configuration.

FIG. 7 is a cross-sectional view of additional portions of the locking system 220. The locking system 220 also includes a tensioner 700 and a linkage 702 coupled to the lockout tube 222. The tensioner 700 includes a bracket 704, a shaft 706 extending through an aperture 708 in a side 710 of the bracket 704, and a biasing component 712 captured on the shaft 706 between the side 710 of the bracket 704 and a flange 714 secured to the shaft 706. In some implementations, the flange 714 may be secured to the shaft between a shoulder 716 and a nut 718 threadably received onto the shaft 706. In other implementations, the flange 714 may be secured to the shaft 706 in other ways, such as by welding, a press fit, or by being integrally formed onto the shaft 706.

In some implementations, the biasing component 712 is a spring, such as a coil spring. In some implementations, the biasing component 712 is a plurality of biasing components. For example, in some implementations, the biasing component 712 is a plurality of Bellville washers 713 stacked along a length of the shaft 706, as shown in FIG. 7. In some implementations, the Bellville washers are arranged in pairs, such that a base of each Bellville washer in a pair abuts each other. Pairs of the Bellville washers may be arranged adjacent to each other along a length of the shaft 706, as shown, for example, in FIGS. 7-9. In some implementations, 32 Bellville washers may be used. However, additional or fewer Bellville washers may be used, and the number of Bellville washers may vary depending upon, for example, sizes and masses of the different components of a header.

In still other implementations, the biasing component 712 may be or include a coil spring. For example, in some instances, the biasing component 712 may include a plurality of coils springs. One or more of the coils springs may be received onto the shaft 706. In still other implementations, the biasing component 712 may be another type of spring.

The tensioner 700 is pivotably coupled to the float arm 214 by a pin 720 coupled to the float arm 214. In the illustrated example, the pin 720 extends through apertures 722 formed in a clevis 724 that is attached to the float arm 214. The shaft 706 extends through a bore 725 formed through the pin 720. A flange 726 captures the shaft 706 onto the pin 720. In some implementations, the flange 726 may be a washer secured to the shaft 706 between a shoulder 728 and a nut 730 threadably received onto a threaded portion 732 of the shaft 706. In other implementations, the flange 726 may be secured to the shaft 706 in other ways, such as a press fit or welding, or the flange 726 may be integrally formed on the shaft 706. The shaft 706 also includes an enlarged portion 734 that abuts against the side 710 of the bracket 704. Engagement between the side 710 and the enlarged portion 734 allows the biasing component 712 to be preloaded between the side 710 and the flange 714. In some implementations, the biasing component 712 may not be preloaded.

The preload applied to the biasing component 712 may be selected to ensure a force applied to the float arms 214 of a locking system 220 by the biasing component 712 lifts the float arms 214 into abutting contact between all of the float arms 214 and a portion of the frame, such as the cross tube 212. Thus, the preload ensures that a force ultimately provided by the biasing component 712 as the locking system 220 is moved into the rigid configuration fully actuates all of the float arms 214 notwithstanding any variations in the header 202, such as manufacturing variations that may otherwise prevent all of the float arms 214 from being in abutting contact with the cross tube 212 when the locking system 220 is in the rigid configuration. As a result, locking systems of the present disclosure are operable to ensure full retraction of all of the float arms of a locking system when placed in the rigid configuration without adjustment during manufacturing or sometime later in the field, such as by a user or technician. Thus, the locking systems and associated headers of the present disclosure reduces maintenance thereto, improves performance of operation of the headers, increases productivity of the headers, and reduces costs of operation of the headers.

The linkage 702 includes a first link 736 coupled to the lockout tube 222 and a second link 738 pivotably coupled to the first link 736 and the bracket 704. In the illustrated example, the first link 738 is attached to the lockout tube 222 with a fastener 739, such as a bolt. However, in other implementations, the first link 738 may be attached to the lockout tube 222 in other ways, such as by welding, interference fit, an adhesive, or by being integrally formed on the lockout tube 222. Also, in the illustrated example, a nut 741 is used to secure the fastener 739 and the first link 736 to the lockout tube 222.

Figure 10:
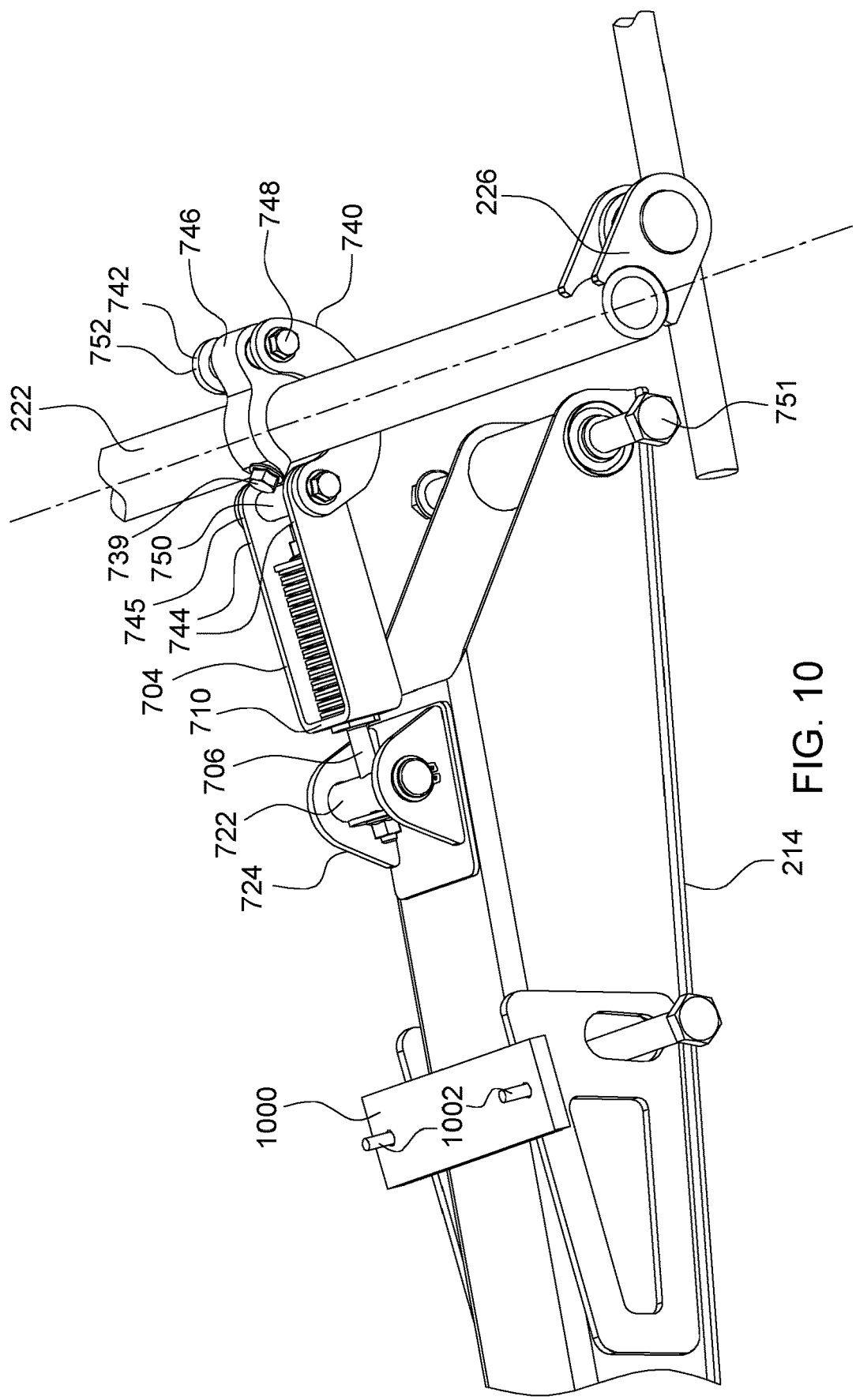
FIG. 10 is a perspective view of an example locking system along with a float arm coupled thereto, according to some implementations of the present disclosure.

Referring to FIG. 10, the bracket 704 has a general U-shape, and the second link 738 includes a first side 740 and a second side 742. Free ends 744 of the bracket 704 are sandwiched between the first and second sides 740 and 742 at a first end 745 of the second link 738. A tab 746 formed on the first link 736 is disposed between the first and second sides 740 and 742 of the second link 738 at a second end 752 of the second link 738. A pin 748 extends through the first and second sides 740 and 742 at the second end 752 of the second link 738 and the tab 746 of the first link 736 to pivotably couple the first link 736 and the second link 738. A pin 750 extends between the free ends 744 of the bracket 704 and the first and second sides 740 and 742 at the first end 745 of the second link 738 to pivotably couple the second link 738 and the bracket 704. In some implementations, the pins 748 and 750 may be a rod or a fastener, such as a bolt. However, the pins 748 and 750 may have other forms to enable the first link 736 to pivot relative to the second link 738 and the bracket 704 to pivot relative to the second link 738. The float arm 214 is pivotable about a pin 751 that pivotably couples the float arm 214 to the mounting bracket 210. The pin 751 may be, for example, a fastener (e.g., a bolt), a shaft, or other component operable to permit pivoting movement of the float arm 214 relative to the mounting bracket 210. FIG. 10 also shows an impact absorber component 1000 that is attached to the frame 200 of the header 202, such as the cross tube 212, and contacts a float arm 214 when retracted into the rigid configuration. The impact absorber component 1000 may be attached to the cross tube 212 with fasteners 1002, which may be, for example, bolts, pins, or rivets.

As shown in FIGS. 7-10, the second link 738 has an arcuate shape that provides a relief or recess 737 that receives the lockout tube 222. The recess 737 formed by the arcuate shape receives the lockout tube 222, allowing the centerline 226 of the lockout tube 222 to intersect with centerline 754 of shaft 706, resulting in the elimination of torque in the lockout tube 222, as described in more detail below. In some instances, the centerlines 226 and 754 may be slightly offset due to slight variations in size of the components, movement of the different components, or variations in components, for example. These slight variations may produce an offset between the centerlines 226 and 754 that, in some cases, may be unavoidable. However, for the purposes of the present disclosure, intersection of the centerlines 226 and 754 is intended to encompass the slight offsets therebetween which may occur.

Figure 8:
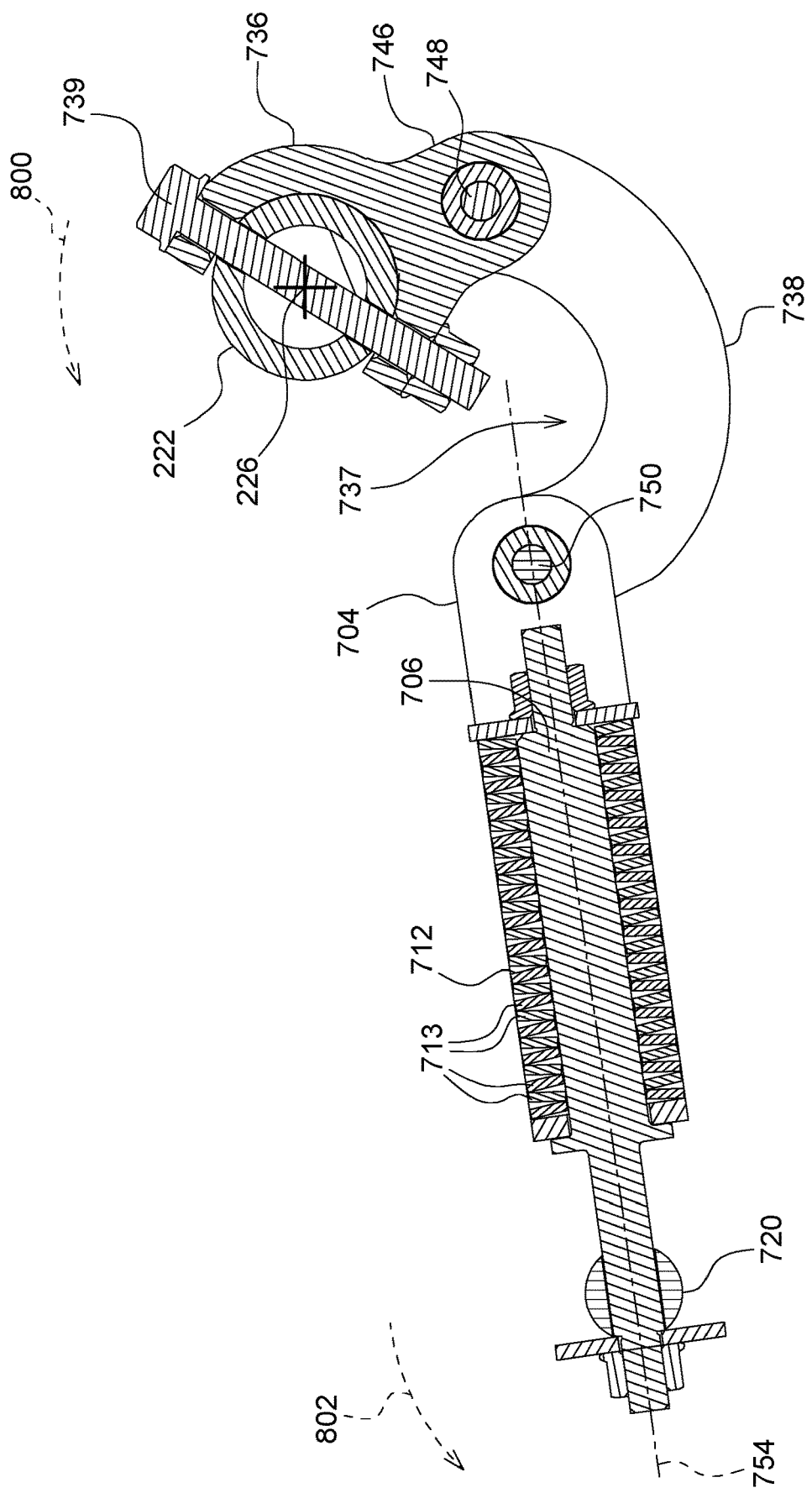
Figure 9:
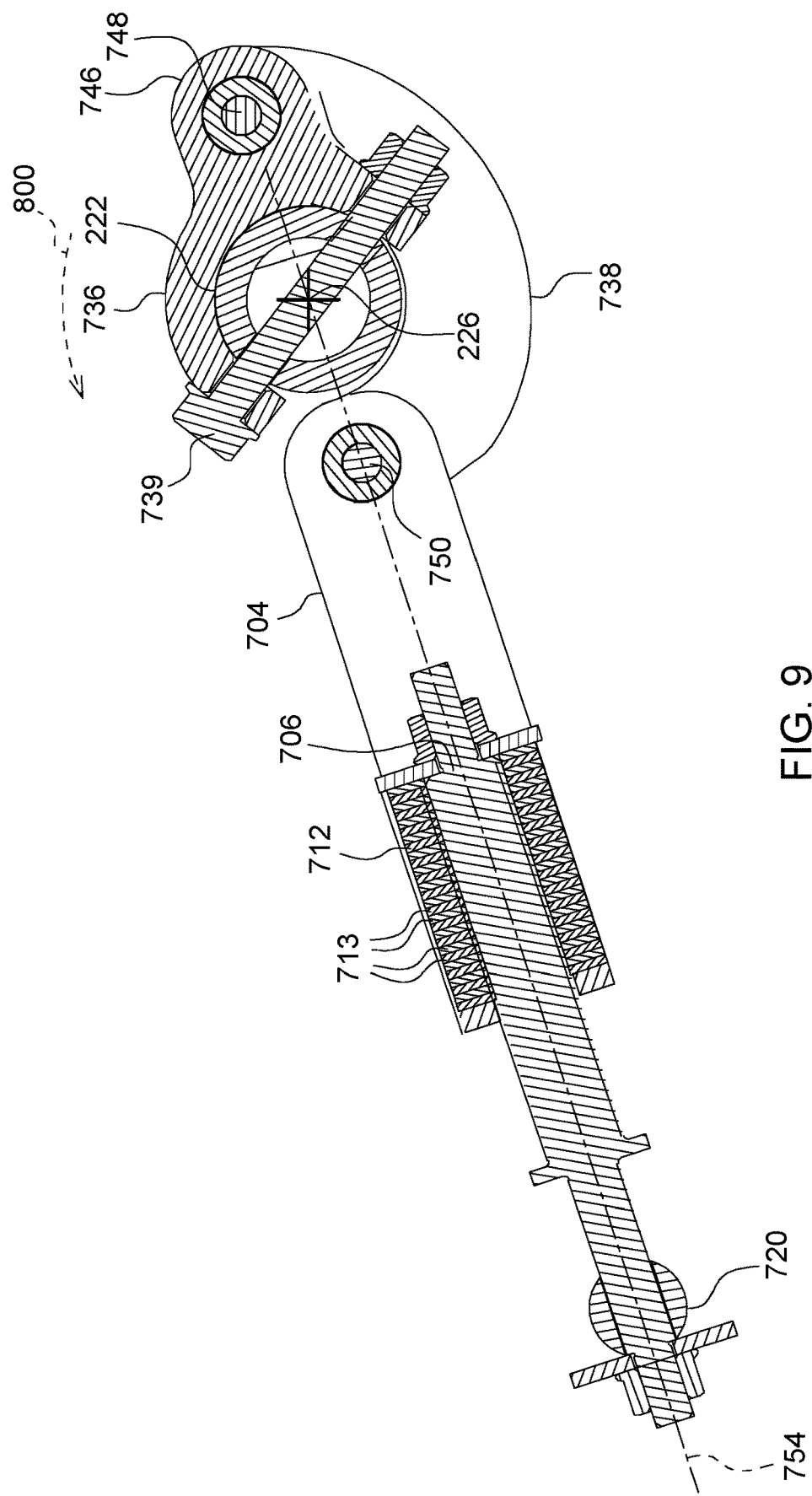

FIGS. 7-9 illustrate actuation of the locking system 220 between the flexible configuration and the rigid configuration. In FIG. 7, the locking system 220 is in the flexible configuration in which the floating arms 214 are in a fully extended. As a result, the float arms 214 are freely pivotably about pin 751. As a result, each of the float arms 214 of a wing, e.g., wing 116 or 118 or wings 204, of a draper head, e.g., draper header 100 or 202, are able to pivot independently of the other float arms 214. Although the present example describes a locking system included on a single wing of a header, in other implementations, a single locking system operable to position all of the float arms of a header between the flexible configuration and a rigid configuration may be used.

Returning again to FIG. 7, the lockout tube 222 is angularly oriented in the second position such that the biasing component 712 is unloaded, other than a preload that may be applied to the biasing component 712. With the lockout tube 222 in the second position, the float arms 214 are freely pivotable about the pin 751, allowing the float arms 714 to follow a contour of the ground when the float arms 714 are placed in contact with the ground. At FIG. 8, the lockout tube 222 is partially rotated in the direction of arrow 800, which causes the shaft 706 to translate relative to and rotate with the pin 720. As a result, the shaft 706 is both rotated and translated towards the lockout tube 222. As shown in FIG. 8, the shaft 706 is displaced to cause the flange 728 to come into contact with the pin 720. Further rotation of the lockout tube 222 in the direction of arrow 800 results in further displacement and rotation of the shaft 706, which, in turn, causes further compression of the biasing component 712.

With the flange 726 in contact with the pin 720, as the lockout tube 222 continues to be rotated in the direction of arrow 800, the float arm 214 is pivoted with the pin 751 in the direction of arrow 802 towards the cross tube 212. Moreover, as the shaft 706 is pivoted in the direction of arrow 802, an amount of torque applied to the lockout tube 222 decreases as the centerline 754 of the shaft 706 approaches the centerline 226 of the lockout tube 222.

FIG. 9 shows the lockout system 220 in the rigid configuration. As shown in FIG. 9, the lockout tube 222 is moved into the first position. As the lockout tube 222 is moved from the position show in FIG. 8 to the position shown in FIG. 9, the float arms 214 are retracted as a result of the contact between the flange 726 and the pin 720. With the locking system 220 in the rigid configuration, the float arms 214 are fully retracted and in abutting contact with the cross tube 212 or another component of the frame 200; the lockout tube 222 resides in the curved recess 737 formed by the second link 738; and the centerline 754 of the shaft 706 intersects the centerline 226 of the lockout tube 222. As a result of the intersection of the centerline 754 and the centerline 226, toque applied to the lockout tube 222 is reduced to approximately zero. Further, with the float arms 214 in the rigid configuration, the knife 216 is also placed into a straight and rigid configuration.

With the torque applied to the lockout tube 222 being effectively zero when the float arms 214 are in the retracted and rigid configuration, a size of lockout tube 222 may be reduced, which results in a weight, size, and cost reduction. Additionally, compression of the biasing component 712 provides a force that is sufficient to retract all of the float arms 214 into abutting contact with cross tube 212, or some other component of the frame 200, notwithstanding any dimensional variations imparted to the frame 200 during manufacturing, for example. Consequently, the locking system 220 is operable to actuate all the float arms 214 into contact with the cross tube 212 without preliminary adjustment during manufacturing or subsequent adjustment when the header has entered use. Thus, the locking system 220 avoids an adjustment preformed during manufacturing or sometime thereafter, such as by a technician or user, to ensure full actuation of the float arms 214 into the rigid configuration.

Figure 11:
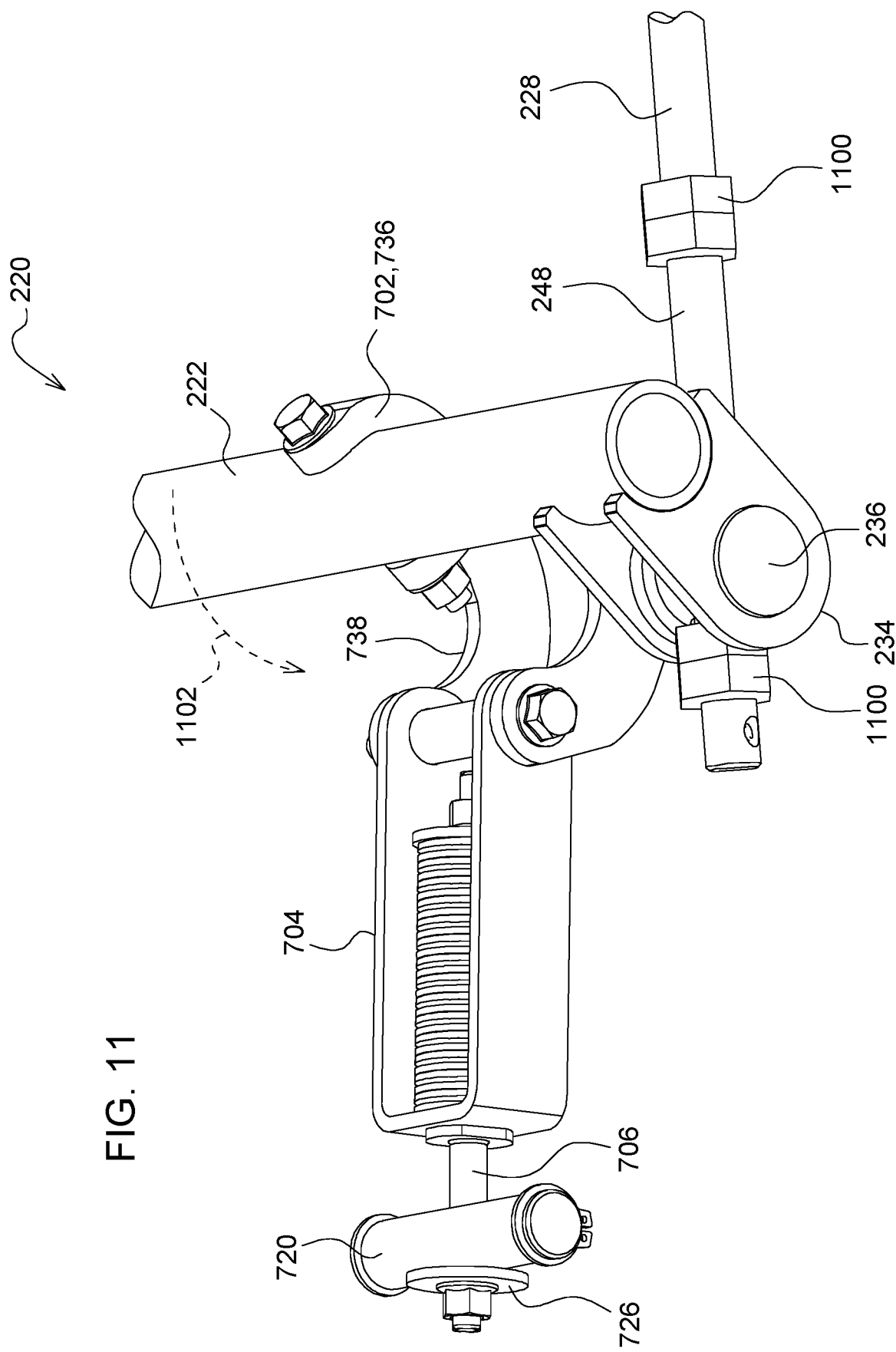
FIGS. 11 through 13 are perspective views of some components of a locking system showing actuation of the locking system between a flexible configuration and a rigid configuration, according to some implementations of the present disclosure.
Figure 12:
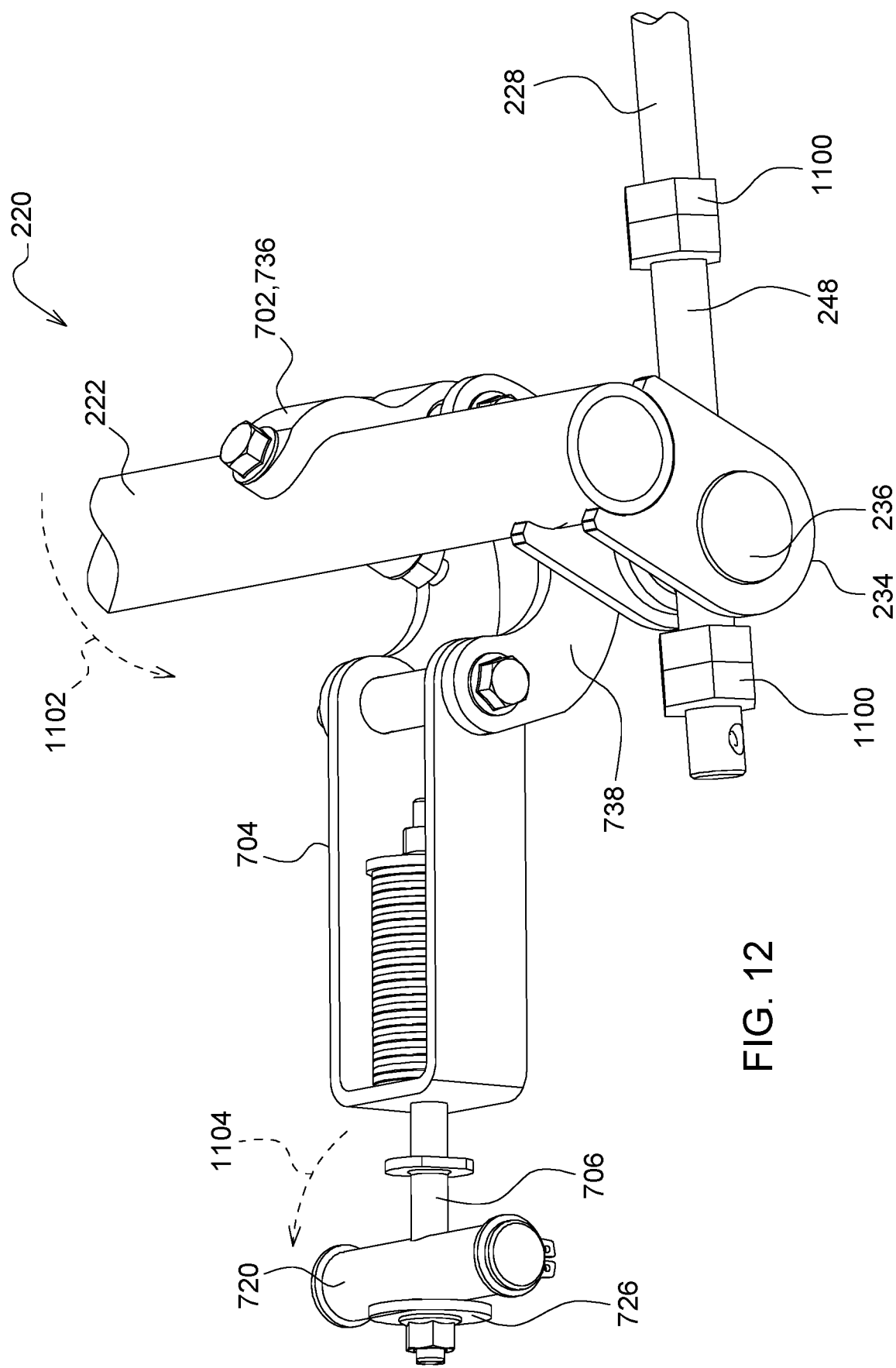
Figure 13:
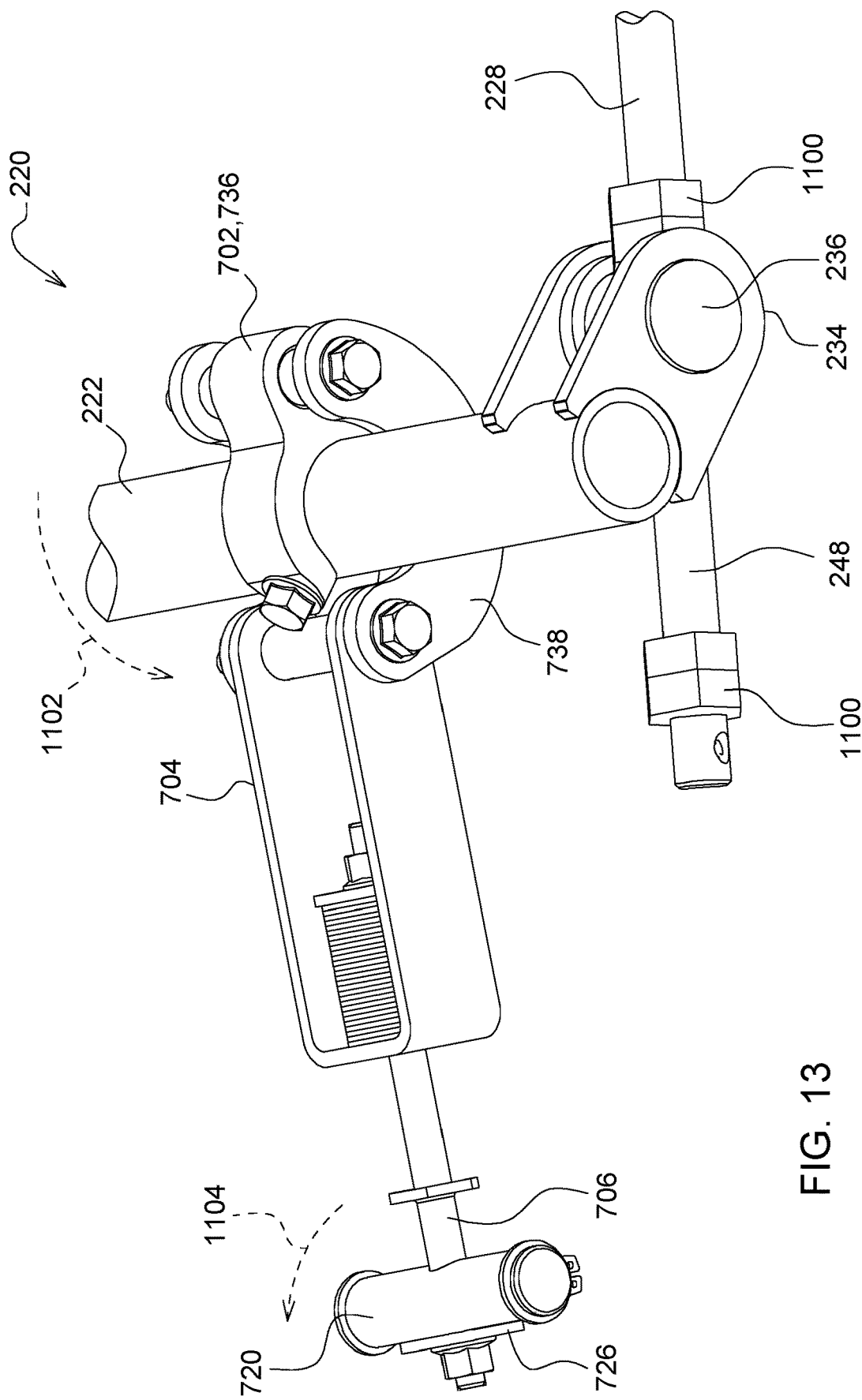

FIGS. 11-13 are perspective views of the example locking system 220 being actuated between the flexible configuration and the rigid configuration. FIG. 11 shows the locking system 220 in the flexible configuration in which the float arms 214 are freely pivotable about pin 751, as shown in FIG. 7, for example. It is noted that, in the illustrate example, the crank 228 includes stops 1100 that allow for a selected amount of rotation of the crank 228. Contact between the stops 1100 and the pin 236 prevents further rotation of the crank 228. However, in other implementations, the stops 1100 may be omitted.

As the crank 228 is rotated in a first rotational direction, the threaded engagement between the threaded portion 248 of the crank and the threaded bore 246 of the pin 236 causes the lockout tube 222 to rotate in the direction of arrow 1102 until contact between the washer 726 and the pin 720 occurs. Referring to FIG. 12, as rotation of the crank 228 in the first rotational direction continues, the lockout tube 222 continues to rotate in the direction of arrow 1102, causing simultaneous rotation of the float arm 214 with the pin 751 in the direction of arrow 1104, thereby retracting the float arm 214, as well as compressing the biasing component 712. Retraction of the float arm 214 continues with continued rotation of the crank 228 in the first rotational direction until the float arms 214 contact the frame 200, such as the cross tube 212. At this point, the locking system 220 is in the rigid configuration, and the centerline 754 of the bolt intersects or approximately intersects the centerline 226 of the lockout tube 222, resulting in no torque or approximately no torque being applied to the lockout tube 222. Thus, FIGS. 11-13 illustrate actuation of a plurality of float arms of a header, such as the float arms contained on a wing of a header, in response to rotation of a crank. Extending the float arms into the flexible configuration from the rigid configuration may be performed by rotating the crank 228 in a second rotational direction, opposite the first rotational direction.

Without in any way limiting the scope, interpretation, or application of the claims appearing below, a technical effect of one or more of the example implementations disclosed herein is providing a lockout system that is operable to actuate float arms into a retracted or rigid configuration without needing adjustments to the header to ensure that the float arms are in contact with the frame of the header. Another technical effect of one or more of the example implementations disclosed herein is reducing a size of a lockout tube by reducing a torque applied to the lockout tube to zero or approximately zero when the float arms are retracted into the rigid configuration. As a result, size, cost, and weight of the lockout system and header, more generally, are reduced.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A harvester header comprising:
a frame;
a plurality of float arms pivotably coupled to the frame;
a knife coupled to distal ends of the float arms; and
a locking system moveable between a flexible configuration in which at least one of the plurality of float arms is pivotable relative to the frame and a rigid configuration in which the at least one of the plurality of float arms is pivotably fixed relative to the frame, the locking system comprising:
a rotatable component rotatably coupled to the frame;
a tensioner comprising:
a first end pivotably coupled to the rotatable component; and
a second end pivotably coupled to a float arm of the plurality of float arms; and
a linkage comprising:
a first link fixedly attached to the rotatable component; and
a second link extending between the first link and the tensioner, the second link comprising:
a first end pivotably coupled to the first link; and
a second end pivotably attached to the first end of the tensioner with a pin,
wherein rotation of the rotatable component in a first direction causes the at least one of the plurality of float arms to become pivotably fixed relative to the frame, placing the locking system in the fixed configuration, and wherein rotation of the rotatable component in a second direction, opposite the first direction, causes the at least one of the float arms to become pivotable relative to the frame, placing the locking system into the flexible configuration.

2. The harvester header of claim 1, wherein the knife is flexible when the locking system is in flexible configuration and wherein knife is rigid when the locking system is in the rigid configuration.

3. The harvester header of claim 1, wherein rotation of the rotatable component in the first direction to pivotably fix the float arm relative to the frame comprises rotation of the rotatable component to pivot the float arm into abutting contact with the frame.

4. The harvester header of claim 1, wherein the frame comprises a plurality of laterally arranged mounting brackets and a laterally extending beam connected to the plurality of mounting brackets, one of the plurality of float arms pivotably connected to one of the plurality of mounting brackets.

5. The harvester header of claim 4, wherein the float arm comprises a first side, a second side, and a third side connecting the first side and the second side, and wherein the third side is in abutting contact with the laterally extending beam when the locking system is in the rigid configuration.

6. The harvester header of claim 1, wherein the tensioner further comprises a shaft that is pivotably coupled to the rotatable component and pivotably coupled to the float arm of the plurality of float arms.

7. The harvester header of claim 6, wherein the shaft is pivotably coupled to the rotatable component by a link.

8. The harvester header of claim 6, wherein the second end of the tensioner is pivotably coupled to the float arm of the plurality of float arms with a pin, wherein the pin comprises a bore, and wherein the shaft extends through the bore of the pin.

9. The harvester header of claim 1, wherein the rotatable component is rotatable about a centerline of the rotatable component.

10. The harvester header of claim 9, wherein movement of the locking system into the rigid configuration comprises rotation of the rotatable component about the centerline to bring a centerline of the tensioner into alignment with the centerline of the rotatable component.

11. The harvester header of claim 1, wherein the tensioner further comprises:
a shaft pivotably coupled to the second link.

12. The harvester header of claim 1, wherein the tensioner is preloaded.

13. A method of actuating a float arm of a harvester header between a flexible configuration in which a knife of the harvester header is able to flex along a length thereof and a rigid configuration in which the knife is prevented from flexing along the length thereof, the method comprising:
rotating a rotatable component that laterally extends along a length of a harvester header about a centerline of the rotatable component, a float arm of the harvester header pivotably coupled to the rotatable component; and
one of retracting a first shaft in a first direction in response to rotation of the rotatable component in a first rotational direction, the retraction of the first shaft in the first direction pivoting the float arm into abutting contact with a portion of a frame of the harvester header in response to rotation of the rotatable component in the first rotational direction or extending the first shaft in a second direction, opposite the first direction, in response to rotation of the rotatable component in a second rotational direction, opposite the first rotational direction, the extension of the first shaft in the second direction pivoting the float arm away from abutting contact with the portion of the frame of the harvester header in response to rotation of the rotatable component in a second rotational direction.

14. The method of claim 13, further comprising, when retracting the first shaft in the first direction in response to rotation of the rotatable component in the first rotational direction, pivoting the first shaft to cause a centerline of the shaft to intersect with the centerline of the rotatable component.

15. The method of claim 13, wherein the rotatable component is pivotably coupled to the shaft via a linkage.

16. The method of claim 15, wherein the first shaft is preloaded.

17. The method of claim 13, further comprising limiting an amount of pivoting of the float arm away from abutting contact with the portion of the frame of the harvester header.

18. The method of claim 17, wherein limiting an amount of pivoting of the float arm away from abutting contact with the portion of the frame of the harvester header comprises contacting a second shaft extending through a slot formed in the float arm with an end of the slot.

* * * * *

UNITED STATES PATENT AND TRADEMARK OFFICE
CERTIFICATE OF CORRECTION

PATENT NO. : 11,559,000 B2
APPLICATION NO. : 16/886844
DATED : January 24, 2023
INVENTOR(S) : Alex Brimeyer Page 1 of 1

It is certified that error appears in the above-identified patent and that said Letters Patent is hereby corrected as shown below:

In the Claims

In Claim 1, at Column 11, Line 45, "fixed configuration" should be changed to --rigid configuration--.

Signed and Sealed this
Tenth Day of December, 2024

*Katherine Kelly Vidal*

Katherine Kelly Vidal
*Director of the United States Patent and Trademark Office*